Aug. 13, 1935.     S. TANABE ET AL     2,011,382
BRAKE FOR ELECTRIC MOTORS
Filed Aug. 23, 1934
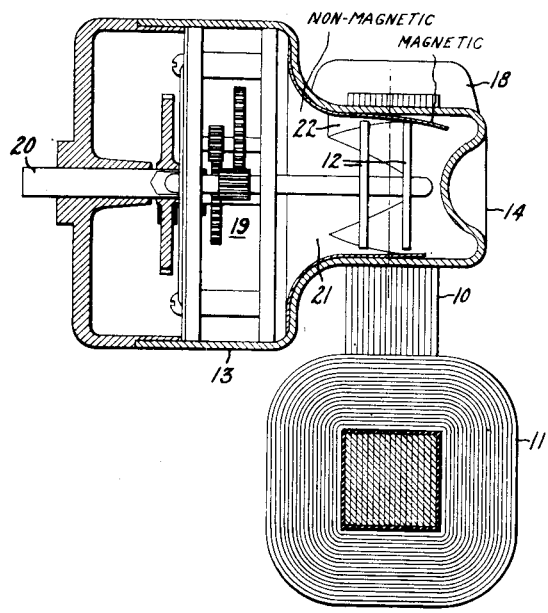
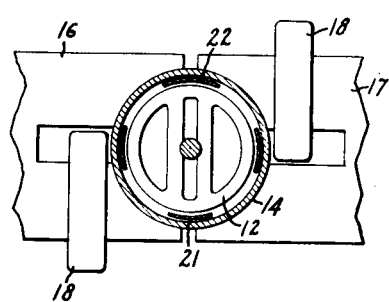
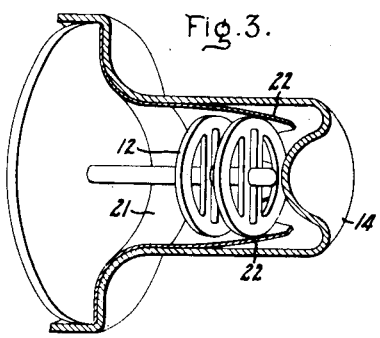
Inventors:
Shitehan Tanabe,
Yasuzo Fujitani,
by Harry E. Dunham
Their Attorney.

Patented Aug. 13, 1935

2,011,382

UNITED STATES PATENT OFFICE 2,011,382

BRAKE FOR ELECTRIC MOTORS

Shitehan Tanabe and Yasuzo Fujitani, Kawasaki, Japan, assignors to General Electric Company, a corporation of New York Application August 23, 1934, Serial No. 741,076
In Japan October 31, 1933

4 Claims. (Cl. 172—120)

Our invention relates to brakes for electric motors and its main object is to provide a motor brake operated by the motor field. The invention is particularly useful in connection with small self-starting synchronous motors such as those employed in synchronous timing and signalling systems where it is desirable that the motor shall stop instantaneously when deenergized.

While not confining our invention to any particular motor structure, we find the invention particularly adapted for use in connection with the type of motor described in United States Patent No. 1,495,936, May 27, 1924, to Warren, and we will describe our invention as applied to such a motor.

The features of our invention which are believed to be novel and patentable will be pointed out in the claims appended hereto. For a better understanding of the invention, reference is made in the following description to the accompanying drawing in which Fig. 1 illustrates a cross-sectional view through a motor to which our invention has been applied; Fig. 2 represents a partially-sectioned end view through a rotor chamber showing one preferred arrangement of our magnetic brake member and its relation with respect to the motor rotor and field poles of the motor; and Fig. 3 represents a partially-sectioned perspective view of a rotor chamber and the parts contained therein, including a modification of our invention involving two brake mechanisms.

A motor, such as described in the above mentioned patent, comprises a bipolar stator member having shaded poles energized by a single-phase coil and operating upon a rotor which is contained in a closed gear casing. Referring to Figs. 1 and 2, 10 represents the salient pole stator field structure, 11 the energizing winding coil, and 12 the rotor of such a motor. The rotor is housed in a reduced portion 14 of a gear casing 13 and the cylindrically-shaped reduced portion is snugly embraced within the curved faces of the pole pieces of the motor stator as best shown in Fig. 2. It will be understood that an alternating flux is produced between the pole pieces represented by reference characters 16 and 17, which flux is given a rotating component by the shading coils 18. This flux, acting on the rotor discs 12 of hardened steel, produces motor action and rotation at a synchronous speed which is dependent upon the frequency of the source of supply. Where the frequency is sixty cycles and the motor is of the two-pole construction represented, the synchronous speed of the rotor is thirty-six hundred revolutions per minute.

The casing 13 contains a gear-reduction unit 19 by means of which the rotor speed is reduced and caused to drive a terminal shaft 20. The gear casing contains a small amount of lubricant and usually a bushing, represented at 21, is provided, extending into the reduced rotor portion 14 of the casing to remove oil therefrom by capillary action as more fully described in the above mentioned patent. The gear casing and the oil-removing bushing 21 are usually made of brass and hence do not interfere with nor are they influenced by the motor fluxes except that negligible eddy currents may be set up therein.

When such a motor is deenergized, the high-speed rotor does not stop instantaneously although usually it stops rotating quickly. It is highly desirable in certain synchronous timing and signalling motors of this character that they have similar stopping characteristics after being deenergized and that they stop instantaneously or as near instantaneously as possible. This similar and quick stopping characteristic is desirable, for example, so that different synchronously operated timing or signalling devices connected to the same system and controlled jointly will not scatter or get out of synchronism even during starting and stopping operations, and anything that can be done to bring about more nearly instantaneous stopping of such motors after being deenergized is an improvement in the right direction.

To this end we provide a magnetically-operated brake in the rotor chamber adjacent the rotor where it can act directly upon the high-speed rotor. In the motor structure described having an oil-removing bushing 21, we prefer to include the magnetically-operated brake as a portion of such bushing although it may be made as a separate piece and secured in place by the bushing or otherwise.

In Fig. 1, that portion of the bushing 21 extending over the rotor and designated by reference character 22 is made of magnetic material and, preferably, the remainder of the bushing is made of brass or other non-magnetic material. The bushing is firmly secured in place when the parts in the casing are assembled. The magnetic part 22 may be soldered or riveted to part 21 and extends out over the rotor as a resilient finger which, when the motor is deenergized, is biased to press against the rotor periphery and produce an effective braking action. As best shown in Fig. 2, this magnetic member 22 substantially bridges the adjacent upper pole tips of the stator. It is prevented from coming in direct contact with the pole tips only by the thin wall of the brass shell 14 which encloses the rotor chamber, but it is in a position to intercept leakage flux which attempts to cross the air gap between such pole tips. As a consequence, when the motor is energized, the magnetic member 22 is drawn by magnetic attraction away from the rotor and towards the adjacent pole pieces where it has no braking action on the rotor. It is sufficiently thin as not to shunt any material amount of flux away from the rotor so that normal motor operation is not impaired by its presence.

The leakage flux which tends to cross between the shaded and unshaded pole tips is, of course, not of constant magnitude but fluctuates between the half-cycle pulsations. The resiliently-supported magnetic finger should preferably have a natural period of vibration different from that of the frequency of the flux pulsations which act thereon so that it will not be noisy when the motor is operating and will not vibrate into contact with the armature and produce a braking action between half-cycle flux pulsations. However, when the motor is deenergized, the finger quickly moves into contact with the rotor periphery and produces an effective brake which instantly stops the rotor. If the brake is properly adjusted, it should move into braking position within the time of one cycle following the last flux pulsation. Since the resilient brake finger comes in contact with the periphery of the motor rotor which has the highest speed of any part of the rotating unit, its braking action is very effective indeed.

In Fig. 3, we have illustrated a modification where two magnetic brake fingers 22 are placed at the top and bottom of the motor rotor. These fingers are secured and supported at their broadened end to the bushing 21, as previously described. They are bent or formed to press against opposite diameters of the rotor when the motor field is deenergized and have sufficient resiliency as to be withdrawn from contact with the rotor by magnetic action when the motor is normally energized and leakage flux is present in the air gap between the tips of the opposite pole pieces where these brake members are positioned.

The main advantage of this double-brake construction is a perfectly balanced arrangement both as regards the motor fluxes and as regards braking action as here the magnetic and braking actions occur on opposite diameters of the rotor.

In accordance with the provisions of the patent statutes, we have described the principle of operation of our invention together with the apparatus which we now consider to represent the best embodiment thereof but we desire to have it understood that the apparatus shown is only illustrative and that the invention may be carried out by other means.

What we claim as new and desire to secure by Letters Patent of the United States, is:—

1. An electric motor having a stator provided with salient pole pieces, an energizing winding on the stator for producing fluxes between said pole pieces, a rotor member positioned between said pole pieces so as to be acted upon by the fluxes therebetween, a thin-walled non-magnetic casing enclosing said rotor and embraced between the pole pieces of said stator, and a brake for said motor comprising a magnetic member resiliently supported within said casing and extending adjacent the rotor to press thereagainst when said motor is deenergized and further positioned in said casing so as to be magnetically withdrawn from contact with said rotor by the fluxes passing between the pole pieces of said stator when the motor is energized.

2. An electric motor comprising a stator having salient pole pieces, an energizing winding thereon for producing fluxes between said pole pieces, a high-speed rotor between said pole pieces so as to be acted upon by the fluxes therebetween, a non-magnetic gear casing having a portion embraced between the pole pieces of said stator and enclosing said rotor, a bushing extending into the rotor portion of said casing for removing oil therefrom by capillary action, a magnetic brake member resiliently supported by said bushing and extending adjacent the rotor within the influence of leakage flux passing between the stator pole pieces, said brake member being biased to press against the periphery of said rotor when the motor is deenergized and to be moved out of contact with said rotor by action of the motor fluxes when the motor is energized.

3. An alternating-current motor comprising a stator magnetic structure provided with an energizing winding and embracing a rotor member acted upon by fluxes from said stator when the motor is energized, a magnetic brake member resiliently supported adjacent said rotor and within the influence of the motor fluxes when the motor is energized, said magnetic member being biased to press against the rotor when the motor is deenergized and to be withdrawn from contact with the rotor by action of the motor fluxes when the motor is energized, said brake member having a natural period of vibration which is different from the frequency of the flux pulsations which act thereon when the motor is energized.

4. An electric motor having a stator with a bipolar field arrangement and having pole pieces, the faces of which are curved to form a substantially cylindrically-shaped air gap and rotor space between the pole pieces, an energizing winding on said stator for producing fluxes between said pole pieces, a rotor within the rotor space acted upon by said fluxes, and a magnetic brake member for said rotor movably supported adjacent the rotor and within the leakage flux path between adjacent pole tips of said pole pieces, said member being biased to press against said rotor when the motor is deenergized and to be withdrawn from contact with said rotor by action of the leakage fluxes between the pole tips of said motor when energized.

SHITEHAN TANABE.
YASUZO FUJITANI.